United States Patent [19]

Seidenberger

[11] 4,210,460
[45] Jul. 1, 1980

[54] SPILL CONTROL COMPOSITION AND USE THEREOF

[75] Inventor: James W. Seidenberger, Bethlehem, Pa.

[73] Assignee: J. T. Baker Chemical Company, Phillipsburg, N.J.

[21] Appl. No.: 624,591

[22] Filed: Oct. 22, 1975

[51] Int. Cl.$^2$ .............................................. B08B 3/08
[52] U.S. Cl. ................... 134/7; 34/DIG. 1; 134/27; 252/88; 252/189; 252/192; 252/259.5
[58] Field of Search ..................... 252/189, 192, 259.5, 252/88; 34/DIG. 1; 134/27, 7

[56] References Cited

U.S. PATENT DOCUMENTS

| | | | |
|---|---|---|---|
| 475,586 | 5/1892 | Mauro | 252/259.5 |
| 2,073,398 | 3/1937 | Chesny | 252/189 |
| 2,270,025 | 1/1942 | Ruhoff | 252/192 |
| 2,601,862 | 7/1952 | Thomson | 252/88 |
| 2,997,445 | 8/1961 | Nuhn | 252/192 |
| 3,638,785 | 2/1971 | Casteel et al. | 206/47 R |

OTHER PUBLICATIONS

Decision of the Board of Appeals, Ex parte Lister et al., Patent No. 3,296,179, paper No. 17, 6 pages.
Solubilities, Seidell, Van Nostrand & Co., 1958, vol. 1, p. 508.

*Primary Examiner*—Benjamin R. Padgett
*Assistant Examiner*—Irwin Gluck
*Attorney, Agent, or Firm*—George W. Rauchfuss, Jr.; Eugene O. Retter

[57] ABSTRACT

A spill of hydrofluoric acid is controlled and cleaned up by being treated with a composition comprising an aqueous solution of calcium acetate and applying to the resulting precipitate an activated composition of powdered magnesia and an appropriate normally solid pH indicator.

2 Claims, No Drawings

SPILL CONTROL COMPOSITION AND USE THEREOF

FIELD OF THE INVENTION

The present invention relates to a formulation for controlling and cleaning up spilled hydrofluoric acid.

BACKGROUND OF THE INVENTION

The property of hydrofluoric acid is such that this acid can cause serious and painful burns to exposed skin or eyes. Moreover, spills of concentrated hydrofluoric acid evolve irritating and harmful fumes which can also lead to deleterious results since it is corrosive in contact with skin. Spilled concentrated hydrofluoric acid should therefore not be allowed to contaminate the air and water. Generally reaction of the concentrated hydrofluoric acid with water and/or most neutralizing substances involves the evolution of much heat and toxic fumes and is therefore avoided.

Therefore, there is a need for a formulation for controling and cleaning up spilled hydrofluoric acid at a relatively safe rate and at a cost that is not prohibitively expensive.

SUMMARY OF THE INVENTION

It has now been found that a formulation composed of an aqueous solution of calcium acetate and a composition composed of powdered magnesia and an appropriate normally solid pH indicator is especially used for the control and cleanup of spilled hydrofluoric acid.

DETAILED DESCRIPTION OF INVENTION

The formulation useful for the purpose of this invention is composed of two compositions. The two compositions are an aqueous solution and a powdered composition. The aqueous solution useful for the purpose of this invention is composed of about 25 to 29% by weight of calcium acetate and about 71 to 75% by weight water, and the powdered composition is composed of about 99.90 to 99.99% by weight powdered magnesia and about 0.01 to 0.1% by weight of an appropriate normally solid pH indicator.

The powdered magnesia, MgO, is preferably of a particle size such that about 95% passes through a U.S. No. 200 sieve. The particle size of the solid pH indicator is not critical to the invention.

A preferred formulation of the invention may be defined as comprising an aqueous composition composed of:
 (A) 163 parts±5% calcium acetate and
 (B) 440 parts±5% deionized water, and a preferred powdered composition is composed of:
 (A) 100.00 parts±10% powdered magnesia (MgO), of a particle size that about 95% passes through a U.S. No. 200 sieve, and
 (B) 0.04 parts±10% solid pH indicator, preferably bromothymol blue sodium salt indicator, wherein the parts are expressed as parts by weight.

An especially preferred aqueous composition comprises one having about 163 parts calcium acetate and about 440 parts deionized water and an especially preferred powdered composition comprises one having about 100 parts powdered magnesium oxide, and about 0.04 parts bromothymol blue sodium salt indicator wherein the parts are parts by weight and the particle sizes are as hereinbefore set forth.

A suitable solid pH indicator for use in the powdered composition of this invention is any suitable pH indicator evidencing a perceptible color change in the range of pH from about 6.0 to 8.0. Especially preferred is a solid pH indicator evidencing a perceptible color change in the range of pH about 7.0. Especially preferred as the pH indicator is bromothymol blue sodium salt evidencing such color change in the pH range of 6.0 to 7.6. As examples of other suitable solid pH indicators useful in the powdered compositions of this invention there may be mentioned phenol red, m-nitrophenol, p-nitrophenol, bromophenol red, neutral red, bromothymol blue, and the like. Bromothymol blue is especially preferred because of its color change in the range 6.0 to 7.6 and also because its color change from yellow to blue is more easily perceptible than the color change from yellow to green especially in males with color blindness. The pH indicator is normally solid, that is, is a solid at room temperature.

The spill control compositions of this invention are especially formulated to provide a safe and effective means of controlling and cleaning up a spill of hydrofluoric acid without excess evolution of heat and fumes. The compositions of this invention permit the dangerous fluoride ion level of the spilled acid to be quickly reduced by the calcium acetate solution in a reaction which is minimal heat so as to remove the immediate extremely hazardous nature of the spill. Thereafter the powdered magnesium oxide composition completes the neutralization at a slower, cooler and safer rate with the magnesium oxide component acting as an absorbent for the reaction product slurry as well as also functioning as a slow neutralization agent.

Following a hydrofluoric acid spill an aqueous composition of this invention may be employed to control and clean up substantially all the spilled hydrofluoric acid by applying the aqueous solution to the spill surface, preferably from the perimeter inward, in a quantity sufficient to react with all the spilled acid. Generally a quantity of aqueous solution equal to at least seven times the estimated volume of the spilled acid is employed. The spilled hydrofluoric acid will react with the aqueous calcium acetate solution forming an extremely water-insoluble white precipitate. Thereafter, the powdered magnesium oxide composition, after being activated by the addition of at least about 350 ml of water to the powdered composition per 110 grams of powdered composition, is applied to and mixed with the spill solution to which the aqueous calcium acetate solution had previously been applied. Observation of the color change of indicator in the slurry will indicate when the slurry has reached an essentially safe pH condition for further handling. In the case of a powdered magnesia composition containing bromothymol blue as the solid pH indicator a change from red/yellow to blue will indicate such a safe state. After the slurry has reached a persistent blue color throughout, the slurry can be readily scraped off the spill surface by use of any suitable scoop, preferably plastic, and placed into any suitable waste disposal container, for example, a plastic disposal bag, and disposed of in accordance with any applicable environmental disposal regulations. In the event the slurry is too fluid for scraping up off the spill surface any suitable absorbent material may be added to the slurry first to decrease the fluidity. A suitable absorbent material would be sawdust or the like.

From the foregoing it will be seen that a composition and method have been provided which will eliminate quickly and easily the hazard to persons working under conditions susceptible to spillage of hydrofluoric acid.

It will be understood that the embodiments discussed herein and the use for the embodiments are merely illustrative of my invention and that one skilled in the art can make suitable modifications thereof without departing from the spirit and intent of the invention.

What is claimed is:

1. A method for the control and cleanup of spilled hydrofluoric acid comprising first applying to the spilled hydrofluoric acid an aqueous solution of about 25 to 29% by weight of calcium acetate and about 71 to 75% by weight of water and thereafter applying to said spilled hydrofluoric acid a powdered composition of about 99.90 to 99.99% by weight powdered magnesium oxide and about 0.01 to 0.10% by weight of a solid pH indicator changing color in the range pH 6.0–8.0, which powdered composition has first been activated by the addition of at least 350 ml of water per 110 grams of powdered composition, and thereafter disposing of the resulting treated hydrofluoric acid slurry after a change in color of the pH indicator in the slurry evidences that the slurry has reached an essentially safe pH condition.

2. A method for the control and cleanup of spilled hydrofluoric acid comprising first applying to the spilled hydrofluoric acid an aqueous solution of about 163 parts by weight of calcium acetate and about 440 parts by weight of deionized water and thereafter applying to said spilled hydrofluoric acid a powdered composition of about 100 parts by weight powdered magnesium oxide and about 0.04 parts by weight of bromothymol blue sodium salt, which powdered composition has first been activated by the addition of at least 350 ml of water per 110 grams of powdered composition, and thereafter disposing of the resulting treated hydrofluoric acid slurry after a change in color of the bromothymol blue sodium salt in the slurry evidences that the slurry has reached an essentially safe pH condition.

* * * * *